US012289821B2

(12) United States Patent
Zhou et al.

(10) Patent No.: US 12,289,821 B2
(45) Date of Patent: Apr. 29, 2025

(54) RING COUPLING STRUCTURE FOR LINEAR ACCELERATOR

(71) Applicant: CHENGDU ELEKOM VACUUM ELECTRON TECHNOLOGY CO. LTD, Chengdu (CN)

(72) Inventors: Lin Zhou, Chengdu (CN); Hao Tao, Chengdu (CN); Jin Guo, Chengdu (CN); Hong Huang, Chengdu (CN); Liang Hu, Chengdu (CN); Mi Tang, Chengdu (CN)

(73) Assignee: CHENGDU ELEKOM VACUUM ELECTRON TECHNOLOGY CO. LTD, Chengdu (CN)

( * ) Notice: Subject to any disclaimer, the term of this patent is extended or adjusted under 35 U.S.C. 154(b) by 178 days.

(21) Appl. No.: 18/115,016

(22) Filed: Feb. 28, 2023

(65) Prior Publication Data

US 2024/0147600 A1 May 2, 2024

(30) Foreign Application Priority Data

Oct. 27, 2022 (CN) ......................... 202211322177.4

(51) Int. Cl.
*H05H 9/04* (2006.01)
*H05H 7/18* (2006.01)
*H05H 7/22* (2006.01)

(52) U.S. Cl.
CPC .............. *H05H 9/044* (2013.01); *H05H 7/18* (2013.01); *H05H 2007/225* (2013.01)

(58) Field of Classification Search
CPC .... H05H 9/044; H05H 7/18; H05H 2007/225; H05H 7/22
See application file for complete search history.

(56) References Cited

U.S. PATENT DOCUMENTS 4,155,027 A * 5/1979 Schriber .................. H05H 9/04 315/5.41
4,988,919 A * 1/1991 Tanabe ..................... H05H 9/04 315/505

* cited by examiner

*Primary Examiner* — Daniel D Chang
(74) *Attorney, Agent, or Firm* — Bayramoglu Law Offices LLC

(57) ABSTRACT

A new ring coupling structure for a linear accelerator includes an acceleration cavity, a coupling cavity, and a beam hole. The acceleration cavity and the coupling cavity are alternately assembled together. The beam hole penetrates through the acceleration cavity and the coupling cavity. The acceleration cavity adopts a bowl-shaped structure, a convex cone structure with a mesoporous is disposed on an inner wall of the acceleration cavity along the beam hole. Coupling holes between the acceleration cavity and the coupling cavity are designed as at least two waist-shaped holes uniformly distributed around the beam hole. The coupling cavity adopts a disc-shaped cavity structure with a thickened edge, and a nose cone is disposed in the coupling cavity and welded with cavity walls at both ends of a coupler. The left and right waveguide plates of the coupling cavity are welded together by using the nose cone.

11 Claims, 9 Drawing Sheets

RING COUPLING STRUCTURE FOR LINEAR ACCELERATOR

CROSS REFERENCE TO THE RELATED APPLICATIONS

This application is based upon and claims priority to Chinese Patent Application No. 2022113221774, filed on Oct. 27, 2022, the entire contents of which are incorporated herein by reference.

TECHNICAL FIELD

The present disclosure relates to the technical field of electron accelerators, and specifically, to a new ring coupling structure for a linear accelerator.

BACKGROUND

An electron linear accelerator is an acceleration device that uses a microwave electromagnetic field to accelerate an electron and has a direct orbit. It is applied widely and has important applications in material science, surface physics, molecular biology, photochemistry, and other fields of science and technology. In the fields of industry, agriculture, and medicine, an accelerator is widely used in isotope production, tumor diagnosis and treatment, radiation disinfection, non-destructive testing, polymer irradiation polymerization, material irradiation modification, ion implantation, ion beam microanalysis, space radiation simulation, nuclear explosion simulation, and other aspects. For example, the most important component of a common medical accelerator is the electron linear accelerator, which uses an ionizing radiation effect of interaction between a ray (including an electron beam) and a substance to make cancer cells die to cure a person of tumors and other diseases. Since the UK first developed the electron linear accelerator for tumor treatment in 1953, it is now an effective treatment method to use the electron beam to produce an X-ray for tumor treatment.

An acceleration cavity chain is one of the key components of the electron linear accelerator.

A microwave is usually propagated by a waveguide tube (usually a circular waveguide tube). A phase velocity (a propagation velocity of a phase of the wave in space, which is short for a phase moving velocity) of the microwave propagation in the waveguide tube is far greater than the velocity of light; in other words, the phase velocity of the microwave electromagnetic field is too fast to accelerate the electron. Therefore, it is necessary to try to reduce the phase velocity of the microwave propagation in the waveguide tube. To resolve this problem, in the prior art, the phase velocity of the microwave propagation can be slowed down by periodically inserting a circular diaphragm with a mesoporous into the circular waveguide tube and relying on the reflection of the diaphragm, and then the microwave electromagnetic field can exchange energy with an electron injected into the microwave electromagnetic field to accelerate the electron. This kind of waveguide tube is known as a disk-loaded waveguide acceleration tube where the circular diaphragm is used to load the waveguide tube and is also referred to as a slow-wave structure.

When a phase of the electron in the microwave electromagnetic field of the disk-loaded waveguide acceleration tube matches an acceleration phase, electromagnetic field energy is converted into electron energy, and the electron is accelerated. When the phase of the electron in the microwave electromagnetic field of the disk-loaded waveguide acceleration tube matches a deceleration phase, the electron energy is converted into the electromagnetic field energy, and the electron is decelerated. Therefore, to ensure that the electron can be continuously accelerated to obtain high energy, the prior art provides the following two different electron acceleration manners: traveling-wave acceleration and standing-wave acceleration.

The traveling-wave acceleration manner corresponds to a traveling-wave electron linear accelerator. A core principle of electron acceleration in this manner is to make the running velocity of the electron equal to a phase velocity of a traveling wave; in other words, the running velocity of the electron and the phase velocity of the traveling wave are synchronous. In this way, the electron can always be accelerated on a wave peak of an electric field.

The standing-wave acceleration manner corresponds to a standing-wave electron linear accelerator. A core principle of electron acceleration in this manner is to make the electron always encounter an acceleration phase of the electric field when leaping in each cavity of the disk-loaded waveguide acceleration tube. In other words, the leaping time of the electron in a cavity is equal to a half cycle of oscillation of the electromagnetic field in the acceleration tube, and the leaping time of the electron is consistent with the time of changing a direction of an acceleration electric field to continuously accelerate the electron.

Based on a layout design, a single-cycle acceleration tube and a double-cycle acceleration tube are available. In the single-cycle acceleration tube, all cavities that a beam passes through are acceleration cavities that can accelerate the electron. In the double-cycle acceleration tube, a cavity that the beam passes through is divided into an acceleration cavity that can accelerate the electron and a coupling cavity that can couple the electron, and the acceleration cavity and the coupling cavity are arranged alternately. An axial coupling structure belongs to a double-cycle structure, and a side coupling structure belongs to a single-cycle structure.

There are mainly two kinds of mature structures for a conventional standing-wave electron linear accelerator:

1. Axially-Coupled Dual-Cycle Slow-Wave Structure (Also Known as an Axially-Coupled Dual-Cycle Disk-Loaded Waveguide Acceleration Tube)

A convex cone structure with a mesoporous, which is similar to a nose cone, is designed to be in the acceleration cavity and is not disposed in the coupling cavity. Specifically, the convex cone structure is disposed on a side that is of a through-hole of each circular diaphragm (also known as a disk-loaded waveguide plate) in the disk-loaded waveguide tube and that constitutes the acceleration cavity but not disposed on a side that constitutes the coupling cavity. This structure has the advantages of a high-quality factor of the acceleration cavity (the quality factor is a times the ratio of total microwave energy in the cavity to electromagnetic energy lost in a cycle, and a higher quality factor leads to a smaller energy loss), a low power loss, and high microwave utilization efficiency. A disadvantage of this structure is that the quality factor of the coupling cavity is low.

2. Side-Coupled Single-Cycle Slow-Wave Structure (Also Known as a Side-Coupled Single-Cycle Disk-Loaded Waveguide Acceleration Tube)

A convex cone structure with a mesoporous, which is similar to a nose cone, is disposed in the acceleration cavity and is also disposed in the coupling cavity. Specifically, the convex cone structure is disposed on a side that is of a through-hole of each circular diaphragm (also known as the disk-loaded waveguide plate) in the disk-loaded waveguide tube and that constitutes the acceleration cavity. This structure has the advantages of a high-quality factor of the acceleration cavity, a low power loss, and high microwave utilization efficiency. Disadvantages of this structure are that the coupling cavity is located on a lateral side of the acceleration cavity and the diameter of the whole tube is too large.

Based on the above characteristics, the present disclosure provides a new ring coupling structure for a linear accelerator. On the premise that the acceleration field strength and the quality factor of the acceleration cavity are not reduced and small size is ensured, the new ring coupling structure can improve the quality factor of the coupling cavity and the maximum power density of the acceleration cavity, fully increase an acceleration gradient, and shorten an acceleration length.

SUMMARY

To overcome the above shortcomings, the present disclosure provides a new ring coupling structure for a linear accelerator based on long-term explorations and attempts, repeated experiments and efforts, and continuous reformation and innovation. Coupling holes between an acceleration cavity and a coupling cavity of the new ring coupling structure are designed as at least two waist-shaped holes uniformly distributed around a beam hole. Such a structure and layout of the coupling hole can improve characteristic impedance by 5%-10% compared with an existing structure and significantly improves the acceleration efficiency of the acceleration cavity. The coupling cavity innovatively adopts a disc-shaped cavity structure with a thickened edge to effectively reduce the axial length of the cavity, and a nose cone with a mesoporous is disposed in the coupling cavity and welded with cavity walls at both ends of a coupler to ensure electrical contact. Disposing the nose cone in the coupling cavity can effectively improve the quality factor of the coupling cavity from 1200 to 2000. In addition, after the left and right waveguide plates of the coupling cavity are welded together by using the nose cone, an electric field of the coupling cavity is completely enclosed, which can avoid affecting the coupling cavity when an electron passes through the coupling cavity. The coupling cavity of the new ring coupling structure adopts a new welding structure, which can significantly improve structural strength and reduce deformation for the new ring coupling structure. In addition, the coupling hole is improved, which improves the coupling coefficient of the coupling cavity and also increases the mode spacing of the coupling cavity. In this way, the allowable range of frequency deviation between each cavity during commissioning is larger, which can significantly reduce the difficulty of cavity welding and the workload of microwave tuning. The whole cavity is rotationally symmetric, which can significantly reduce its processing difficulty.

To achieve the above objective, the present disclosure adopts the following technical solutions: A new ring coupling structure for a linear accelerator is provided. The new ring coupling structure for a linear accelerator includes an acceleration cavity, a coupling cavity, and a beam hole. The acceleration cavity and the coupling cavity are alternately assembled together. The beam hole penetrates through the acceleration cavity and the coupling cavity. The acceleration cavity adopts a bowl-shaped structure. The convex cone structure with a mesoporous is disposed on an inner wall of the acceleration cavity along the beam hole. Coupling holes between the acceleration cavity and the coupling cavity are designed as at least two waist-shaped holes uniformly distributed around the beam hole. The coupling cavity adopts a disc-shaped cavity structure with a thickened edge to effectively reduce the axial length of the cavity. A nose cone is disposed in the coupling cavity and welded with cavity walls at both ends of a coupler to ensure electrical contact.

Further, in a preferred technical solution of the new ring coupling structure for a linear accelerator according to the present disclosure, the left and right waveguide plates of the coupling cavity are welded together by using the nose cone to ensure the electrical contact and completely enclose an electric field of the coupling cavity.

Further, in a preferred technical solution of the new ring coupling structure for a linear accelerator according to the present disclosure, a cross-section of the coupling cavity is in a shape combined by an outer-side triangle and an inner-side rectangle, where the rectangle is located at an angle of the triangle. A combination of a triangular cavity and a disc cavity is formed through rotation around the center line of the beam hole, and the waist-shaped hole is located in a region in which the disc cavity is located.

Further, in a preferred technical solution of the new ring coupling structure for a linear accelerator according to the present disclosure, the waist-shaped hole is located on the inner side of the disc cavity, and the innermost side of the disc cavity is closer to the beam hole than that of the waist-shaped hole.

Further, in a preferred technical solution of the new ring coupling structure for a linear accelerator according to the present disclosure, waist-shaped holes at two ends of a single acceleration cavity are correspondingly disposed, and waist-shaped holes between adjacent acceleration cavities are staggered.

Further, in a preferred technical solution of the new ring coupling structure for a linear accelerator according to the present disclosure, an angle of a cross-section triangle of the triangular cavity of the coupling cavity is set as a fillet.

Further, in a preferred technical solution of the new ring coupling structure for a linear accelerator according to the present disclosure, the coupling structure is composed of a structural block A and a structural block B. The acceleration cavity is composed of the structural block A on the left side and the structural block B on the right side. The coupling cavity is composed of the structural block B and another structural block A on the right side of the structural block B. The structural block A and the structural block B are alternately stacked to form a middle part. The structural block A or the structural block B at both ends is provided with an installation opening connected to another component.

Further, in a preferred technical solution of the new ring coupling structure for a linear accelerator according to the present disclosure, an outer edge of the structural block A is lower than a height of a waveguide plate of the structural block A.

Further, in a preferred technical solution of the new ring coupling structure for a linear accelerator according to the present disclosure, an outer edge of the structural block B is higher than the nose cone of the coupling cavity.

Further, in a preferred technical solution of the new ring coupling structure for a linear accelerator according to the present disclosure, the circumference of the nose cone of the coupling cavity is smaller than the inner diameter of a circular region surrounded by the waist-shaped hole, and the height difference between the waist-shaped hole and the nose cone of the coupling cavity forms a step.

Compared with the prior art, the technical solutions of the present disclosure have the following advantages:

1. The outer diameter of the cavity is consistent with that of an axial coupling structure. The acceleration cavity generally adopts the bowl-shaped structure, and the convex cone structure with the mesoporous, which is similar to the nose cone, is designed to be in the middle of the acceleration cavity. A beam enters the next cavity in turn after passing through the mesoporous. The coupling holes between the acceleration cavity and the coupling cavity are designed as the at least two waist-shaped holes uniformly distributed around the beam hole. Such a structure and layout of the coupling hole can improve characteristic impedance by 5%-10% compared with an existing structure and significantly improves the acceleration efficiency of the acceleration cavity.

2. The coupling cavity innovatively adopts the disc-shaped cavity structure with the thickened edge to effectively reduce the axial length of the cavity, and the nose cone with the mesoporous is disposed in the coupling cavity and welded with the cavity walls at both ends of the coupler to ensure the electrical contact. Disposing the nose cone in the coupling cavity can effectively improve the quality factor of the coupling cavity from 1200 to 2000. In addition, after the left and right waveguide plates of the coupling cavity are welded together by using the nose cone, the electric field of the coupling cavity is completely enclosed, which can avoid affecting the coupling cavity when an electron passes through the coupling cavity.

3. The coupling cavity of the new ring coupling structure adopts a new welding structure, which can significantly improve the structural strength and reduce deformation for the new ring coupling structure. In addition, the coupling hole is improved, which improves the coupling coefficient of the coupling cavity and also increases the mode spacing of the coupling cavity. In this way, the allowable range of the frequency deviation between each cavity during commissioning is larger, which can significantly reduce the difficulty of cavity welding and the workload of microwave tuning. The whole cavity is rotationally symmetric, which can significantly reduce its processing difficulty.

BRIEF DESCRIPTION OF THE DRAWINGS

To describe the technical solutions in the implementations of the present disclosure more clearly, the following briefly describes the accompanying drawings for describing the implementations. It should be understood that the following accompanying drawings show merely some embodiments of the present disclosure, and therefore should not be regarded as a limitation on the scope. A person of ordinary skill in the art may still derive other related drawings from these accompanying drawings without creative efforts.

Figure 1:
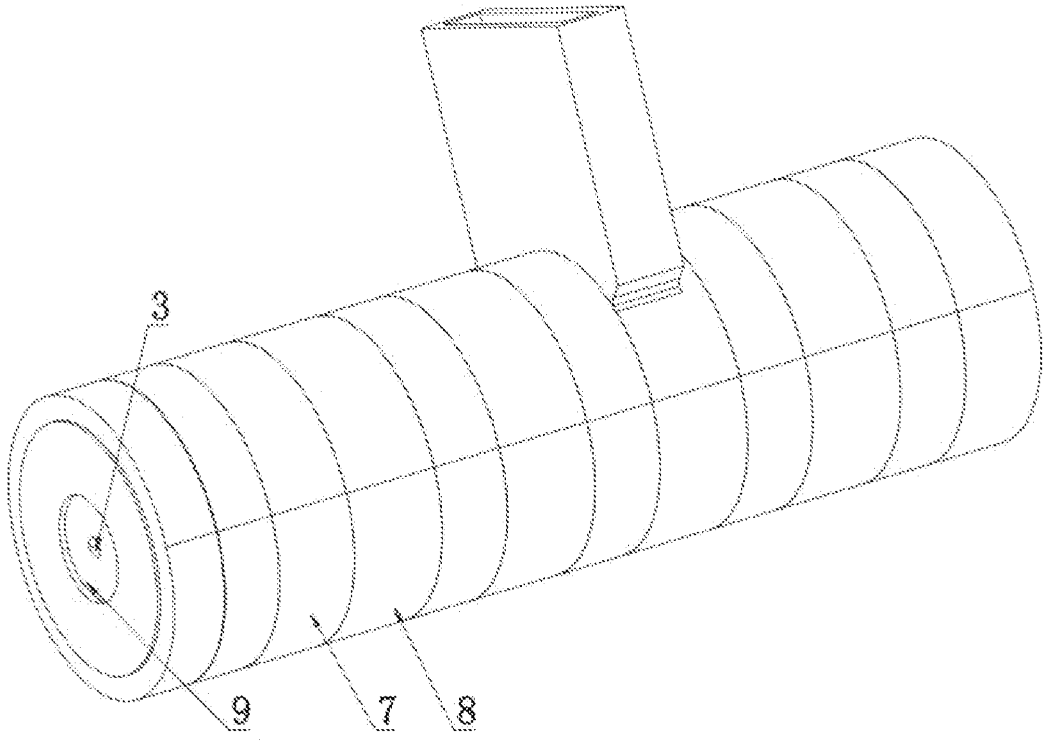
FIG. 1 is a schematic structural diagram of a new ring coupling structure for a linear accelerator according to the present disclosure.

Reference numerals: 1. acceleration cavity; 2. coupling cavity; 201. triangular cavity; 202. disc cavity; 3. beam hole; 4. convex cone; 5. waist-shaped hole; 6. nose cone; 601. step; 7. structural block A; 8. structural block B; 9. installation opening; 10. Cavity walls; 11. Waveguide plates of coupling cavity; 12. Waveguide plate of structure block.

DETAILED DESCRIPTION OF THE EMBODIMENTS

To make the objectives, technical solutions, and advantages of the present disclosure clear, the technical solutions in the implementations of the present disclosure will be clearly and completely described below. The described implementations are some, rather than all of the implementations, of the present disclosure. Based on the implementations of the present disclosure, all other implementations obtained by a person of ordinary skill in the art without making creative efforts shall fall within the protection scope of the present disclosure. Therefore, the following detailed description of the implementations of the present disclosure is not intended to limit the protection scope of the present disclosure but merely represents the selected implementations of the present disclosure.

It should be noted that similar reference signs and letters represent similar items in the accompanying drawings below. Therefore, once an item is defined in one accompanying drawing, it does not need to be further defined and described in subsequent accompanying drawings.

Embodiment

Figure 2:
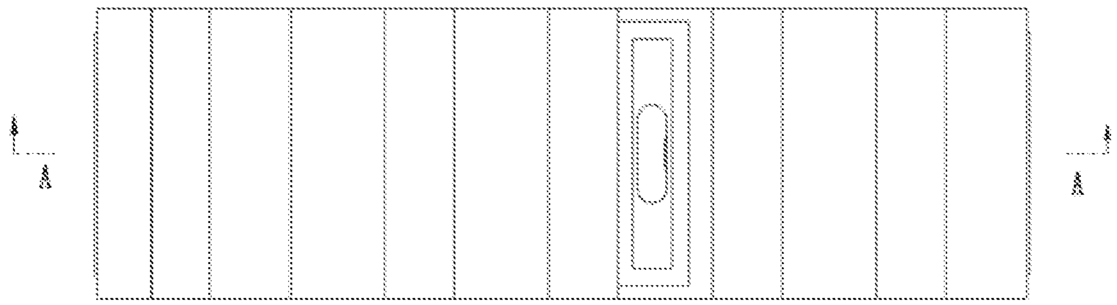
FIG. 2 is a top view of a new ring coupling structure for a linear accelerator according to the present disclosure.
Figure 3:
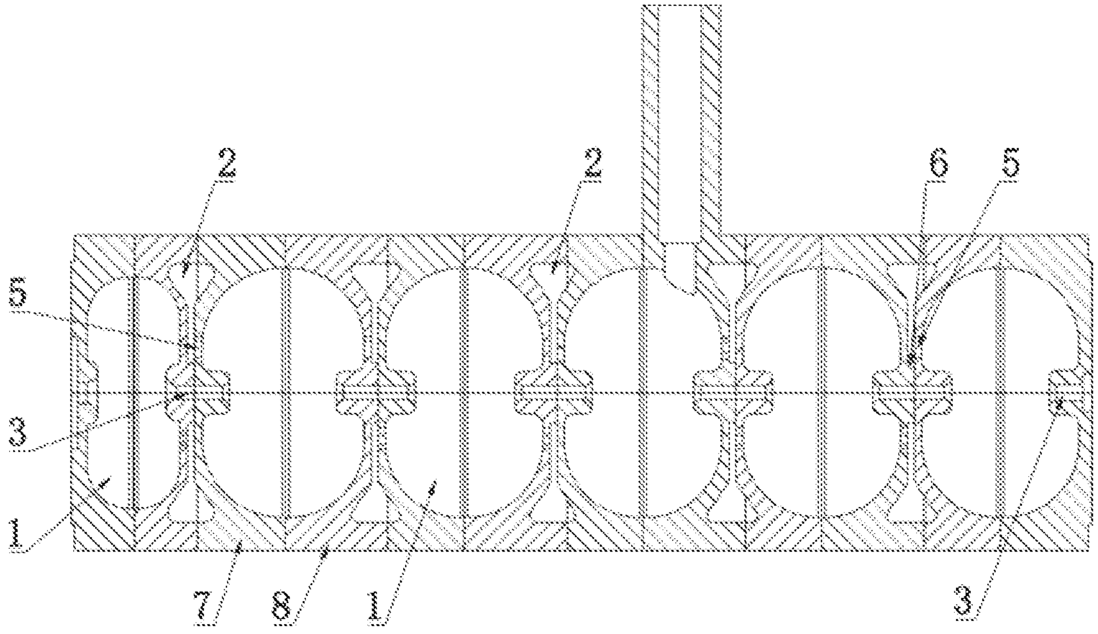
FIG. 3 is a sectional view of A-A in FIG. 2.
Figure 4:
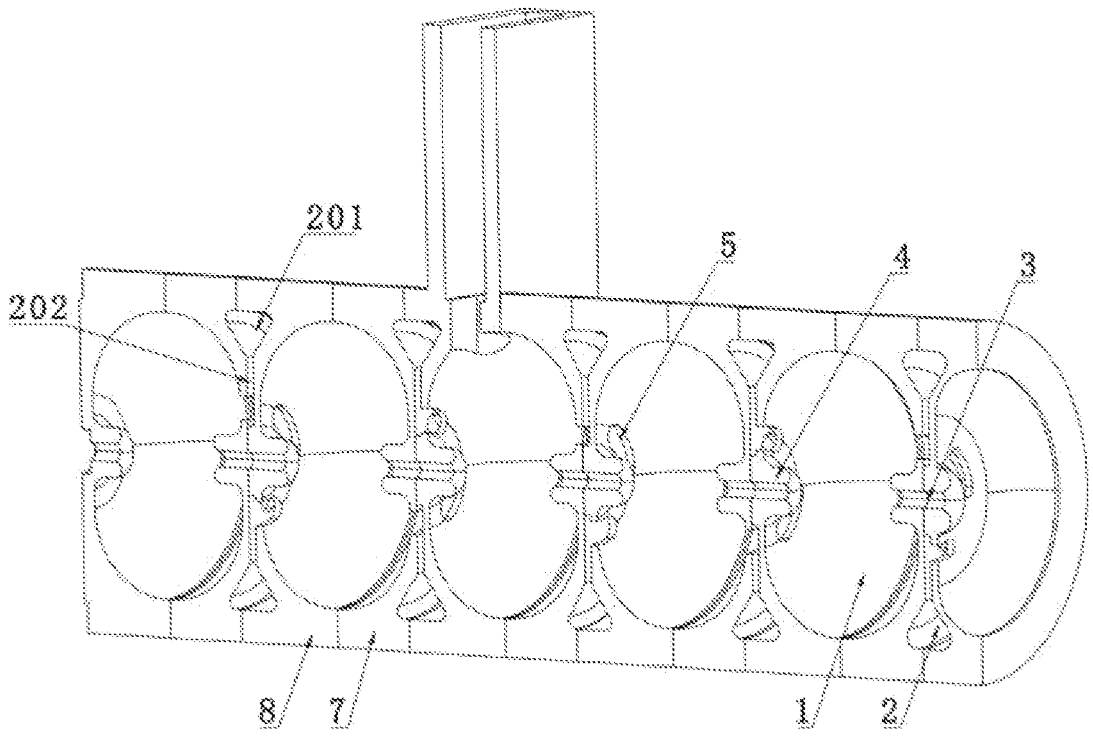
FIG. 4 is a schematic diagram of an internal structure of a new ring coupling structure for a linear accelerator according to the present disclosure.
Figure 5:
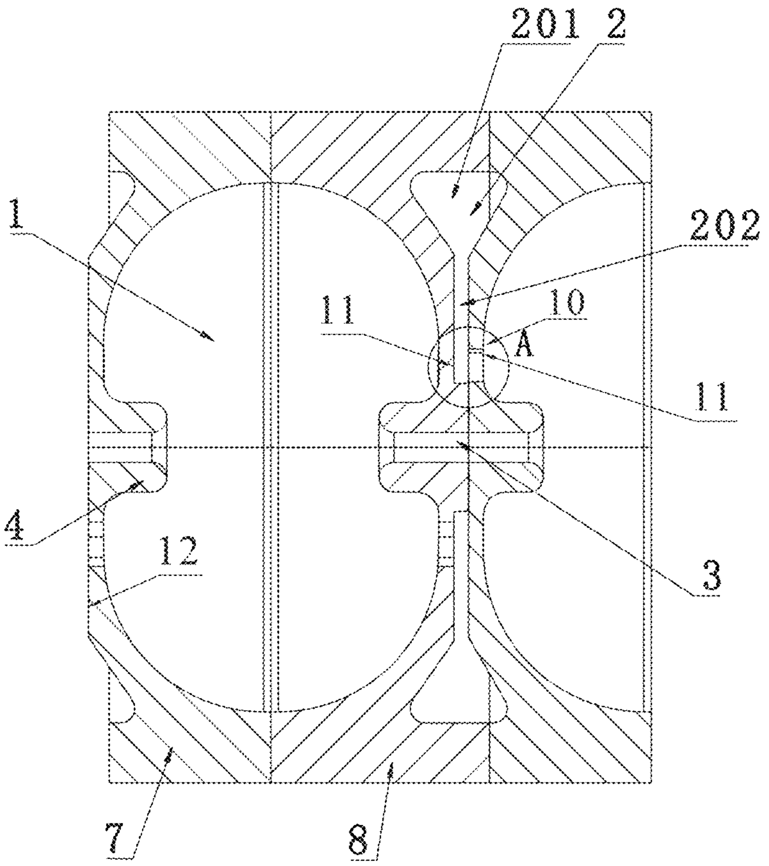
FIG. 5 is a combination diagram of a structural block A and a structural block B selected from FIG. 3.
Figure 6:
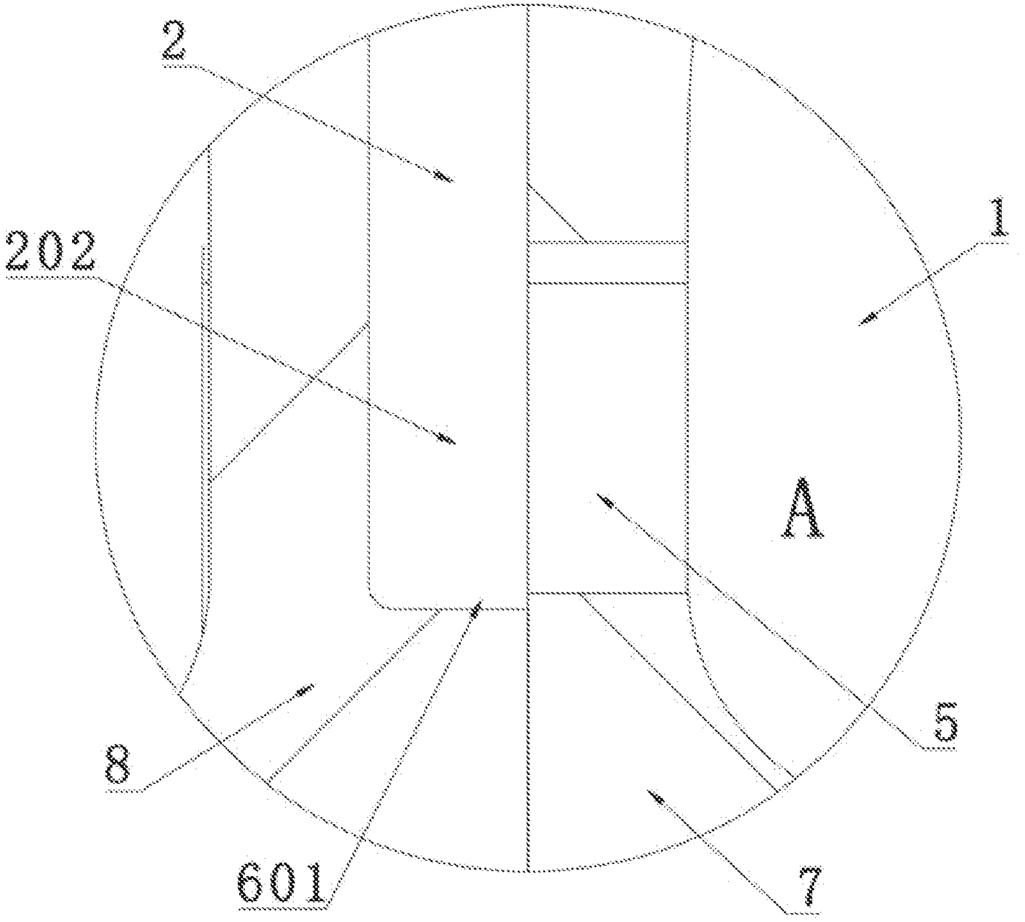
FIG. 6 is a partially enlarged view of A in FIG. 5.
Figure 7:
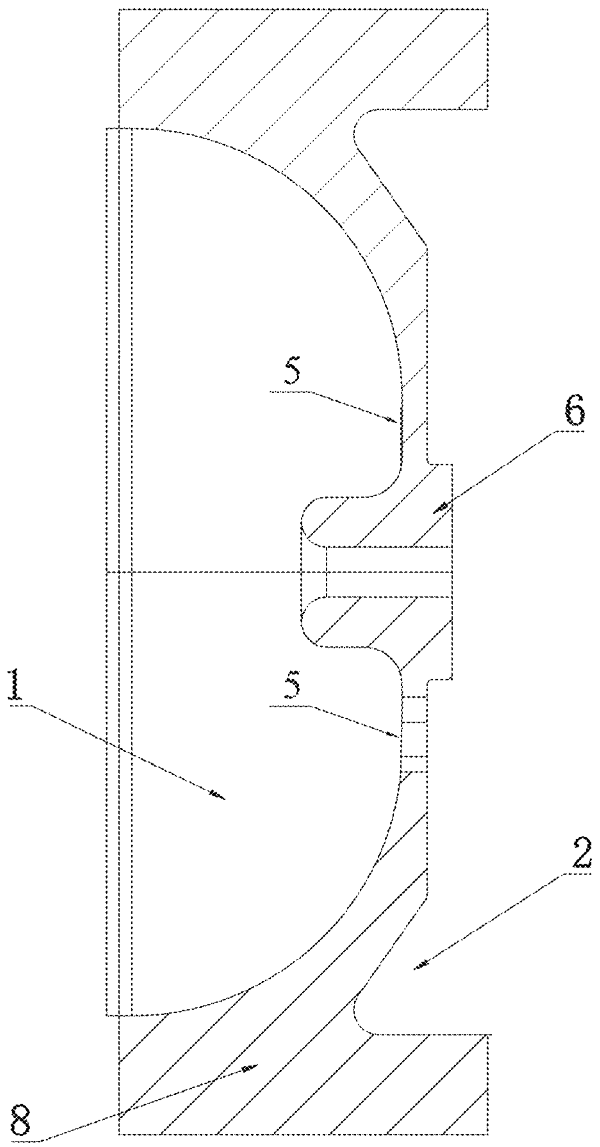
FIG. 7 is a sectional view of a structural block B along a plane of a center line of a beam hole.
Figure 8:
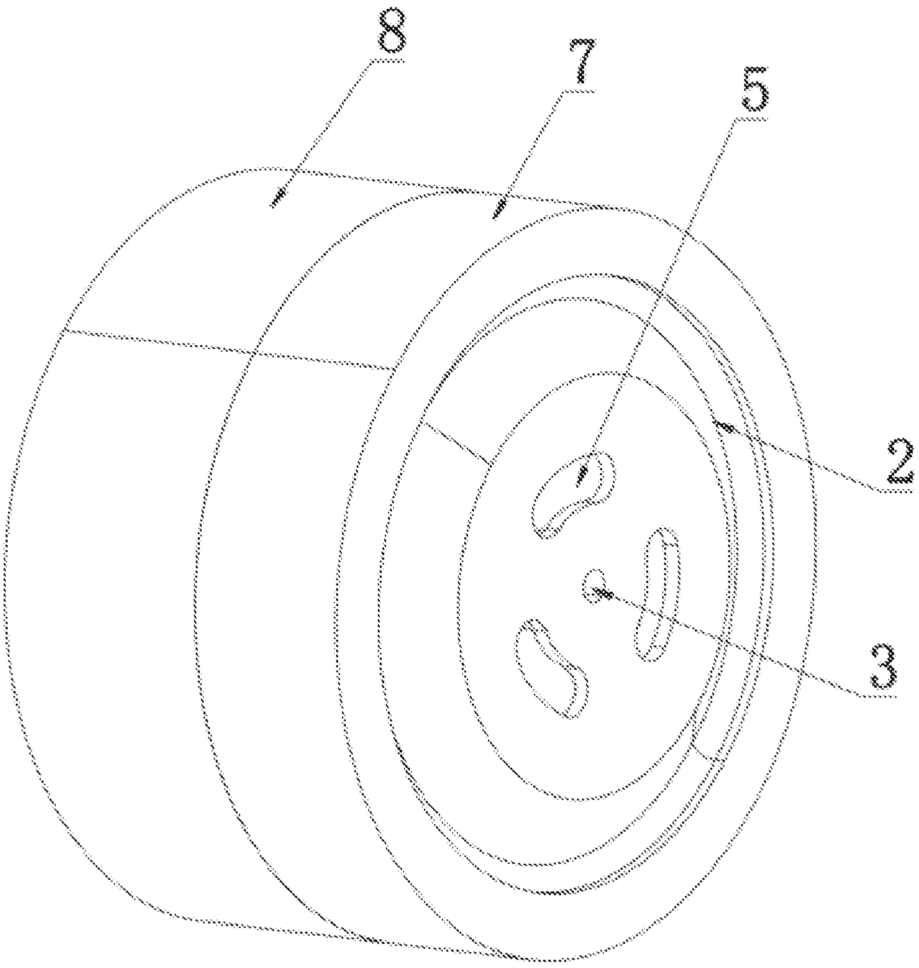
FIG. 8 is a schematic structural diagram of combining a structural block A and a structural block B of a new ring coupling structure for a linear accelerator according to the present disclosure.
Figure 9:
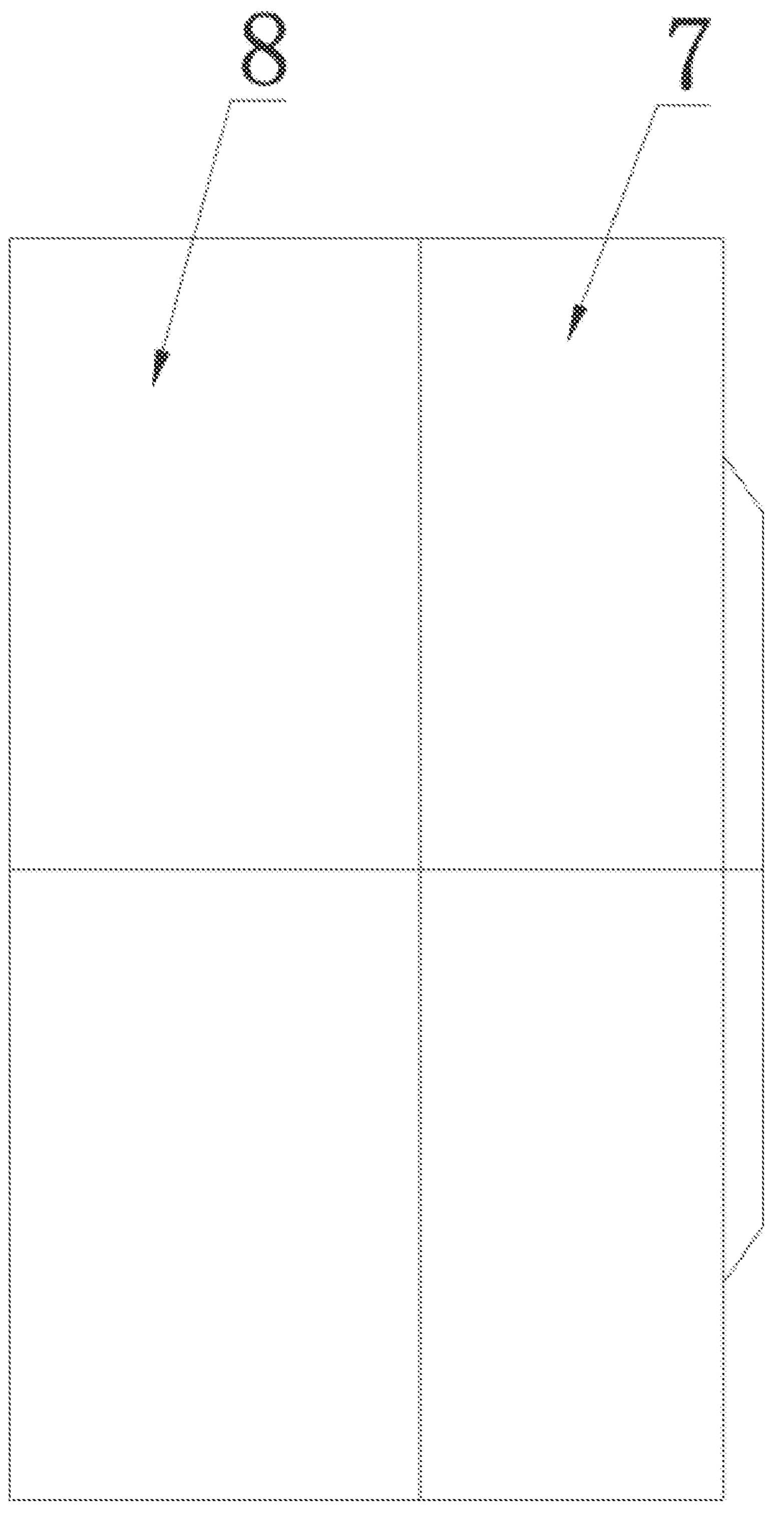
FIG. 9 is a front view of FIG. 8.
Figure 10:
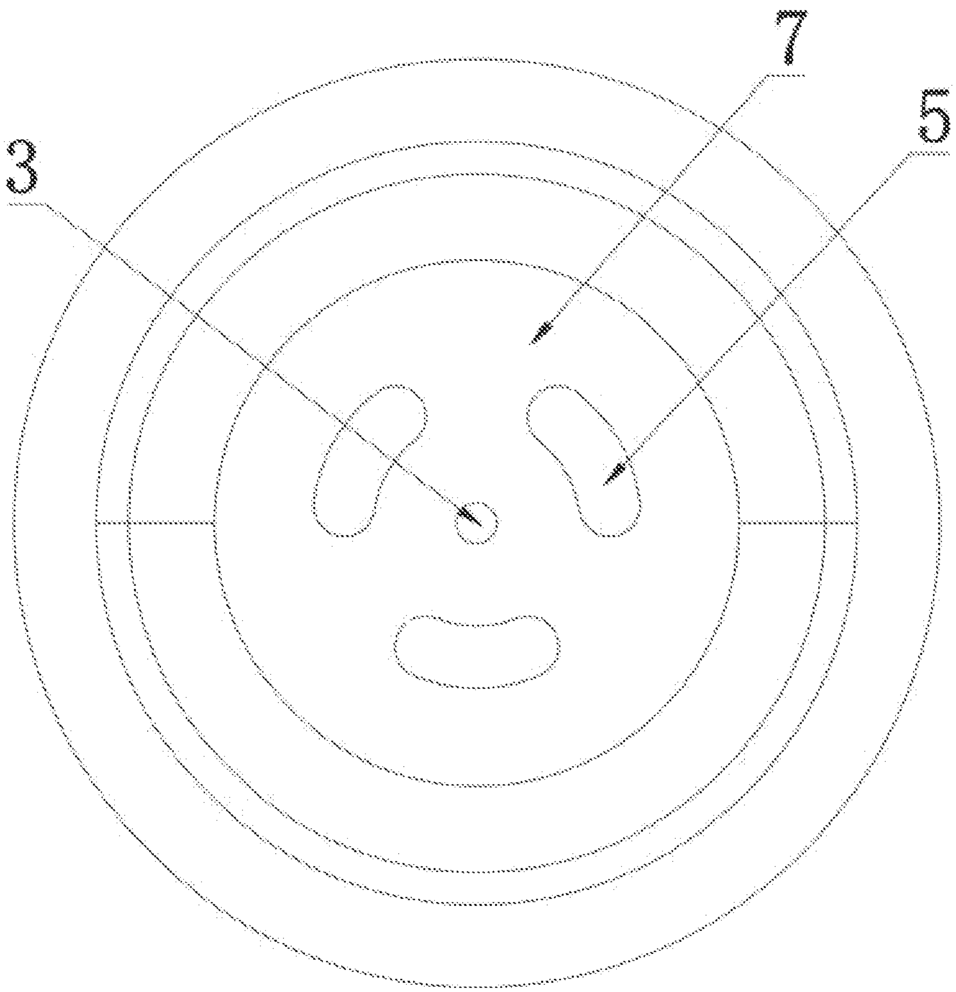
FIG. 10 is a right view of FIG. 8.
Figure 11:
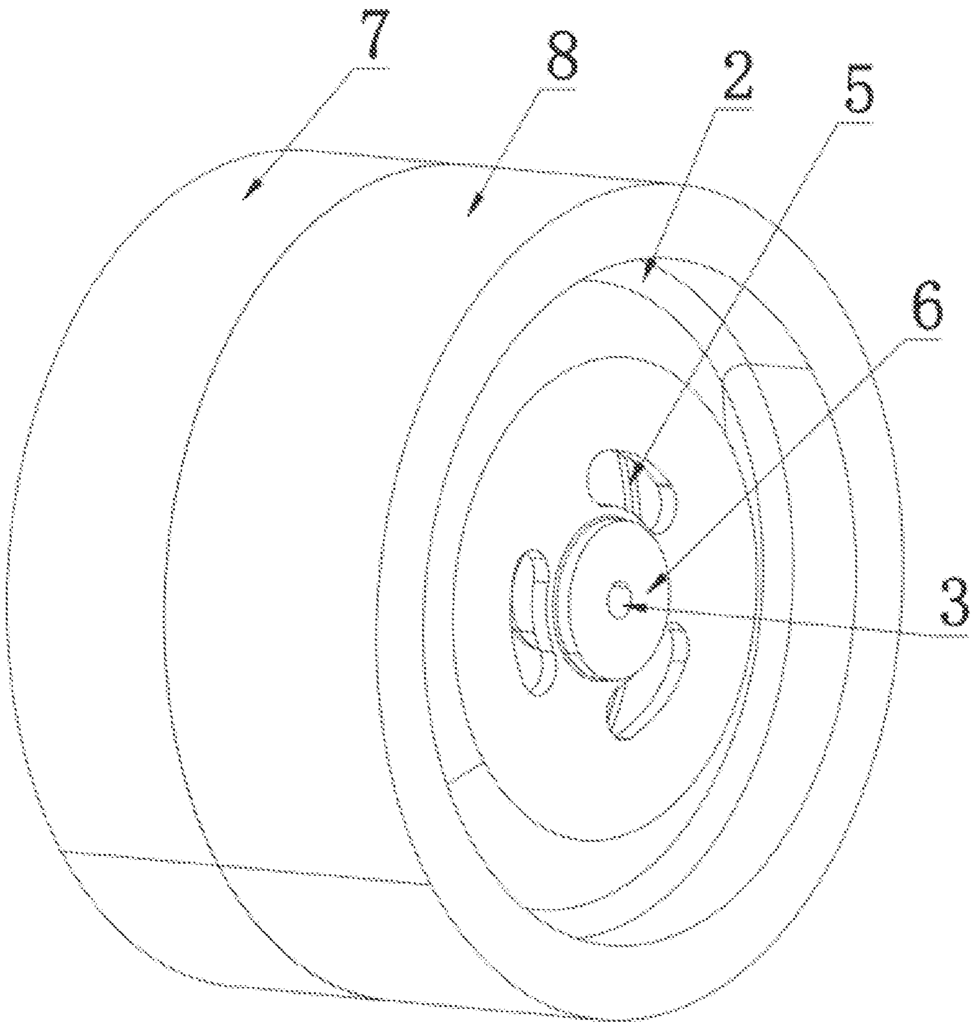
FIG. 11 is a schematic structural diagram of a left view of FIG. 8.

FIG. 1 to FIG. 11 show a new ring coupling structure for a linear accelerator. The new ring coupling structure includes an acceleration cavity, a coupling cavity, and a beam hole. The acceleration cavity and the coupling cavity are alternately assembled together. The beam hole penetrates through the acceleration cavity and the coupling cavity. The acceleration cavity adopts a bowl-shaped structure. A convex cone structure with a mesoporous is disposed on an inner wall of the acceleration cavity along the beam hole. Coupling holes between the acceleration cavity and the coupling cavity are designed as at least two waist-shaped holes uniformly distributed around the beam hole. In this embodiment, three waist-shaped holes are adopted. The coupling cavity adopts a disc-shaped cavity structure with a thickened edge to effectively reduce the axial length of the cavity, and a nose cone is disposed in the coupling cavity and welded with cavity walls at both ends of a coupler to ensure electrical contact. Disposing the nose cone in the coupling cavity can effectively improve the quality factor of the coupling cavity from 1200 to 2000. The left and right waveguide plates of the coupling cavity are welded together by using the nose cone to ensure electrical contact. In this way, an electric field of the coupling cavity is completely enclosed, which can avoid affecting the coupling cavity when an electron passes through the coupling cavity in a conventional axial coupling structure. Owing to an improved quality factor, the coupling cavity can effectively reduce a microwave transmission loss, improve its energy utilization efficiency, reduce microwave feeding power, and effectively extend the service life of a microwave source (magnetron).

A cross-section of the coupling cavity is in a shape combined by an outer-side triangle and an inner-side rectangle, where a cross-section is a plane that coincides with the center line of the beam hole, and the rectangle is located at an angle of the triangle. The triangle herein is an isosceles triangle or an equilateral triangle, and the top angle of the triangle faces the direction of the center line of the beam hole. A combination of a triangular cavity and a disc cavity is formed by rotating the combined shape of the cross-section around the center line of the beam hole. The waist-shaped hole is located in a region where the disc cavity is located. The triangular cavity and the disc cavity are combined to constitute the coupling cavity. Certainly, the shape of the triangular cavity may change based on design parameters and actual processing. For example, in this embodiment, the angle of the cross-section triangle of the triangular cavity of the coupling cavity is set as a fillet, which can make it more convenient to process the triangular cavity to some extent.

The edge of the coupling cavity is thickened to effectively reduce the axial size of the cavity and shorten a length of a whole tube while keeping the diameter of the cavity unchanged.

The waist-shaped hole is located on the inner side of the disc cavity, and the innermost side of the disc cavity is closer to the beam hole than that of the waist-shaped hole, such that the waist-shaped hole is completely located at a position of the acceleration cavity.

Waist-shaped holes at two ends of a single acceleration cavity are correspondingly disposed, and waist-shaped holes between adjacent acceleration cavities are staggered.

The coupling structure is composed of structural block A and structural block B. The acceleration cavity is composed of the structural block A on the left side and the structural block B on the right side. The coupling cavity is composed of the structural block B and another structural block A on the right side of the structural block B. The structural block A and the structural block B are alternately stacked to form a middle part. The structural block A or the structural block B at both ends is provided with an installation opening connected to another component. The installation opening is disposed based on a beam channel to make an electron beam pass through conveniently. The shape of the installation opening may be set based on a component to be connected. Only a relatively standard structure is provided in the present disclosure.

An outer edge of the structural block A is lower than a height of a waveguide plate of the structural block A. An outer edge of the structural block B is higher than the nose cone of the coupling cavity; in other words, the coupling cavity is partially on the structural block A and partially on the structural block B and is mainly on the structural block B, which can ensure that a connection position does not coincide with a position of the disc cavity when the structural block A and the structural block B constitute the coupling cavity.

The circumference of the nose cone of the coupling cavity is smaller than an inner diameter of a circular region surrounded by the waist-shaped hole, and a height difference between the waist-shaped hole and the nose cone of the coupling cavity forms a step to form a nose cone structure specific to the present disclosure.

The outer diameter of the cavity is consistent with that of an axial coupling structure. The acceleration cavity generally adopts the bowl-shaped structure, and the convex cone structure with the mesoporous, which is similar to the nose cone, is designed to be in the middle of the acceleration cavity. A beam enters the next cavity in turn after passing through the mesoporous. The coupling holes between the acceleration cavity and the coupling cavity are designed as the at least two waist-shaped holes uniformly distributed around the beam hole. The new coupling hole can improve characteristic impedance by 5%-10% compared with an existing structure and significantly improves the acceleration efficiency of the acceleration cavity.

The coupling cavity innovatively adopts the disc-shaped cavity structure with the thickened edge to effectively reduce the axial length of the cavity, and the nose cone with the mesoporous is disposed in the coupling cavity and welded with the cavity walls at both ends of the coupler to ensure the electrical contact. Disposing the nose cone in the coupling cavity can effectively improve the quality factor of the coupling cavity from 1200 to 2000. In addition, after the left and right waveguide plates of the coupling cavity are welded together by using the nose cone, the electric field of the coupling cavity is completely enclosed, which can avoid affecting the coupling cavity when an electron passes through the coupling cavity.

The acceleration cavity is a microwave resonator, and the physical size of the cavity determines the resonant frequency of the cavity. An electron linear accelerator is composed of a series of acceleration cavities and coupling cavities in series, and resonant frequencies of the acceleration cavities and the coupling cavities must be consistent during operation. A cavity chain welding process of the electron linear accelerator requires that the cavity needs to be brazed at a high temperature for a plurality of times in a vacuum furnace/hydrogen furnace. There is always physical deformation of the cavity in the welding process, and the resonant frequency will drift. As an acceleration structure of the electron linear accelerator, a disk-loaded waveguide has high characteristic impedance due to a contribution of one spatial harmonic of a backward wave to the acceleration in the case of a $\pi$ mode of a standing wave. However, due to a zero group velocity in the $\pi$ mode, the spacing between adjacent modes is very small. Therefore, an acceleration cavity chain is particularly sensitive to machining tolerance, cavity welding deformation, and beam load.

The coupling cavity of the new ring coupling structure adopts a new welding structure, which can significantly improve the structural strength and reduce the deformation of the new ring coupling structure. In addition, the coupling hole is improved, which improves the coupling coefficient of the coupling cavity and also increases the mode spacing of the coupling cavity. In this way, the allowable range of frequency deviation between each cavity during commissioning is larger, which can significantly reduce the difficulty of cavity welding and the workload of microwave tuning. The whole cavity is rotationally symmetric, which can significantly reduce its processing difficulty.

It should be understood that, in the description of the present disclosure, terms, such as "central", "longitudinal", "transverse", "length", "width", "thickness", "upper", "lower", "front", "back", "left", "right", "vertical", "horizontal", "top", "bottom", "inner", "outer", "clockwise", and "anticlockwise", are used to indicate orientations or position relations shown in the accompanying drawings. Such terms are used herein for ease and simplification of the description of the present disclosure rather than indicating or implying that the stated device or element must have a specific orientation or must be constructed and operated in a specific orientation, and thus should not be construed as limitations to the present disclosure.

In the present disclosure, unless otherwise clearly specified, the terms such as "mounting", "interconnection", "connection" and "fixation" are intended to be understood in a broad sense. For example, the "connection" may be a fixed connection, a removable connection, or an integral connection; a mechanical connection or an electrical connection; a direct connection or an indirect connection via a medium; or communication or interaction between two elements. Those of ordinary skill in the art may understand specific meanings of the above terms in the present disclosure based on a specific situation.

In the present disclosure, unless otherwise expressly specified and defined, that a first feature is "above" or "under" a second feature may include that the first feature is in direct contact with the second feature, or that the first feature and the second feature are not in direct contact with each other but are in contact by using another feature between them. In addition, that the first feature is "over", "above", and "on" the second feature includes that the first feature is directly above and diagonally above the second feature or simply indicates that a horizontal height of the first feature is larger than that of the second feature. That the first feature is "beneath", "below", and "under" the second feature includes that the first feature is directly below and diagonally below the second feature or simply indicates that the horizontal height of the first feature is smaller than that of the second feature.

The above described are merely preferred implementations of the present disclosure. It should be pointed out that the preferred implementations should not be construed as a limitation to the present disclosure, and the protection scope of the present disclosure should be subject to the claims of the present disclosure. Those of ordinary skill in the art may make several improvements and modifications without departing from the spirit and scope of the present disclosure, but the improvements and modifications should fall within the protection scope of the present disclosure.

What is claimed is:

1. A new ring coupling structure for a linear accelerator, comprising an acceleration cavity, a coupling cavity, and a beam hole, wherein the acceleration cavity and the coupling cavity are alternately assembled together, the beam hole penetrates through the acceleration cavity and the coupling cavity, the acceleration cavity adopts a bowl-shaped structure, a convex cone structure with a mesoporous is disposed on an inner wall of the acceleration cavity along the beam hole, coupling holes between the acceleration cavity and the coupling cavity are designed as at least two waist-shaped holes uniformly distributed around the beam hole, the coupling cavity adopts a disc-shaped cavity structure with a thickened edge to effectively reduce an axial length of the coupling cavity, and a nose cone is disposed in the coupling cavity and welded with cavity walls at two ends of a coupler to ensure an electrical contact, wherein the coupling holes are disposed directly adjacent to the nose cone.

2. The new ring coupling structure according to claim 1, wherein left and right waveguide plates of the coupling cavity are welded together by using the nose cone to ensure the electrical contact and completely enclose an electric field of the coupling cavity.

3. The new ring coupling structure according to claim 1, wherein a cross-section of the coupling cavity is in a shape combined by an outer-side triangle and an inner-side rectangle, wherein the inner-side rectangle is located at an angle of the outer-side triangle, and a combination of a triangular cavity and a disc cavity is formed through a rotation around a center line of the beam hole, and each of the at least two waist-shaped holes is located in a region, wherein the disc cavity is located in the region.

4. The new ring coupling structure according to claim 3, wherein each of the at least two waist-shaped holes is located on an inner side of the disc cavity, and an innermost side of the disc cavity is more adjacent to the beam hole than an innermost side of each of the at least two waist-shaped holes.

5. The new ring coupling structure according to claim 4, wherein waist-shaped holes at two ends of a single acceleration cavity are correspondingly disposed, and waist-shaped holes between adjacent acceleration cavities are staggered.

6. The new ring coupling structure according to claim 3, wherein an angle of a cross-section triangle of the triangular cavity of the coupling cavity is set as a fillet.

7. The new ring coupling structure according to claim 1, wherein waist-shaped holes at two ends of a single acceleration cavity are correspondingly disposed, and waist-shaped holes between adjacent acceleration cavities are staggered.

8. The new ring coupling structure according to claim 1, wherein the new ring coupling structure comprises a structural block A and a structural block B, the acceleration cavity comprises the structural block A on a left side and the structural block B on a right side, the coupling cavity comprises the structural block B and another structural block A on a right side of the structural block B, the structural block A and the structural block B are alternately stacked to form a middle part, and the structural block A or the structural block B at two ends is provided with an installation opening connected to another component.

9. The new ring coupling structure according to claim 8, wherein an outer edge of the structural block A is lower than a height of a waveguide plate of the structural block A.

10. The new ring coupling structure according to claim 8, wherein an outer edge of the structural block B is higher than the nose cone of the coupling cavity.

11. The new ring coupling structure according to claim 8, wherein a circumference of the nose cone of the coupling cavity is smaller than an inner diameter of a circular region surrounded by the at least two waist-shaped holes, and a height difference between each of the at least two waist-shaped holes and the nose cone of the coupling cavity forms a step.

* * * * *